US007006792B2

(12) United States Patent
Wilson

(10) Patent No.: US 7,006,792 B2
(45) Date of Patent: Feb. 28, 2006

(54) WIRELESS ANDON COMMUNICATION METHOD AND SYSTEM

(76) Inventor: Robert H Wilson, 302 Broadway, Lawrenceburg, KY (US) 40342

( * ) Notice: Subject to any disclaimer, the term of this patent is extended or adjusted under 35 U.S.C. 154(b) by 550 days.

(21) Appl. No.: 10/065,221

(22) Filed: Sep. 26, 2002

(65) Prior Publication Data

US 2004/0203701 A1 Oct. 14, 2004

(51) Int. Cl.
*H04B 7/24* (2006.01)

(52) U.S. Cl. .................... 455/39; 455/41.2; 455/404.1; 340/300; 340/306; 340/307

(58) Field of Classification Search ............. 455/404.1, 455/39, 41.1, 41.2, 404.2, 414.1, 414.2, 418–420; 340/539.16, 825.68, 825.35, 500–503, 825.06, 340/825.14, 825.17, 825.69, 825.72, 539.1, 340/539.11, 539.17, 299–300, 306–307

See application file for complete search history.

(56) References Cited

U.S. PATENT DOCUMENTS

| | | | | |
|---|---|---|---|---|
| 4,186,388 | A * | 1/1980 | Robinson | 340/556 |
| 5,233,347 | A | 8/1993 | Dahl et al. | |
| 5,422,638 | A | 6/1995 | Singer et al. | |
| 5,594,409 | A | 1/1997 | Shank | |
| 5,828,294 | A * | 10/1998 | Shank | 340/326 |
| 5,926,111 | A | 7/1999 | Davis et al. | |
| 5,982,103 | A | 11/1999 | Mosebrook et al. | |
| 6,104,313 | A * | 8/2000 | Boyd, II | 340/908.1 |
| 6,637,904 | B1 * | 10/2003 | Hernandez | 362/8 |
| 2002/0142812 | A1 * | 10/2002 | Goodman | 455/572 |

FOREIGN PATENT DOCUMENTS

| | | |
|---|---|---|
| JP | 06208690 | 7/1994 |
| JP | 06222749 | 8/1994 |

OTHER PUBLICATIONS

Website: http://www.delphion.com/tdbs/tdb?order=93A+63051, IBM Technical Disclosure Bulletin dated Nov. 1993, Store Label System with Wireless Communications, 4 pp.

Website: http://www.sccontrols.com/scc970.htm, SCC 970 Statboard, 2 pp.

Website: http://www.ams-i.com/partners, Adaptive Micro Systems Solution Partner, 1 p.

Website: http://www.electronicdisplays.com/production_andon.html, EDI Specialists in Information Displays, 2 pp.

Website: http://www.simcotech.com/andon1.htm, Simco Technologies Inc., 5 pp.

* cited by examiner

*Primary Examiner*—Temica Beamer
*Assistant Examiner*—Anthony S. Addy
(74) *Attorney, Agent, or Firm*—Brooks & Kushman P.C.

(57) ABSTRACT

A portable wireless andon communication system and method for use in manufacturing, assembly and other industrial settings. A transmitter station and receiver station are set up for immediate use by simply connecting each to a standard power source. A user needing assistance manually activates a switch at the transmitter station, thus turning on a light and transmitting a corresponding signal to the receiver station. The receiver station receives the signal and turns on a corresponding light and tone generator. The tone generator and light alert indicate to the proper parties the request for a response. A responding party scans transmitter stations for the corresponding light and provides assistance. The switch may be a sensor activated by a change in state indicating that assistance is required. The portable system is easily reconfigured if necessitated by layout changes in a manufacturing line.

8 Claims, 10 Drawing Sheets

WIRELESS ANDON COMMUNICATION METHOD AND SYSTEM

BACKGROUND OF INVENTION

1. Field of the Invention

The present invention relates to an andon communication system and method and, more particularly, a wireless system and method for using such a system in manufacturing, assembly and other industrial settings.

2. Background Art

Communication in an industrial setting is of vital importance to coordinating activities and maintaining production. Employees must communicate when they need more parts, have a quality problem, need assistance, or simply need to use the restroom. Keeping an operation running is also of vital importance to productivity that depends upon systems for keeping employees at their workstations. However, due to equipment that blocks sight lines, noise that makes conversation difficult, and other distractions, it is difficult to communicate with employees at their workstations.

Communication in industrial settings is addressed in several ways. No communication is required if an employee simply leaves their workstation to fix a problem. However, employees cannot perform value added work while they are away from their workstations. In addition, some problems cannot be addressed by the appropriate party and will likely reoccur. If the employee leaves their workstation to find the appropriate party to address a problem and then returns to their workstation, downtime may be caused that can impact productivity depending on the employee and the responsible party's location. Instead of leaving their workstation, an employee may yell or use hand signals to attract the attention of the responsible party. This method distracts the employee's attention away from their work and only works as long as the environment is not too loud or if visual contact is possible.

In an effort to overcome the shortcomings of these previous methods, two-way radios may be used to enable employees to communicate to one another. However, high quality radios are expensive, often costing over a thousand dollars each to purchase. Two-way radios require new or recharged batteries to keep the system functioning properly. In addition, employees must stop value-added production activities to talk on a radio, thus defeating the purpose of having the radios in the first place.

Another system for communication in an industrial facility is commonly referred to as an "andon system." An andon system typically has a rope that runs through an employee's workstation and is tied to a switch. When the switch is activated, a light on a "scoreboard" illuminates to indicate the station that activated the system. When activated, a tone generator may begin to play to attract attention. In addition, andon systems may be tied into a conveyor system or a production control system to stop the line. This system and method is very effective because it allows employees to quickly activate the system without leaving their workstation and then continue to work while waiting for assistance. However, andon systems are hardwired which makes them expensive to install. Andon systems tend to be inflexible so that changes in layout of a line necessitate revamping the andon system. Andon systems are also expensive to build and maintain due to the need to integrate them with other systems. Andon systems are too expensive and impractical for manufacturers who frequently change production line layouts. As a result, most industrial environments do not use andon systems but rely on simpler, less efficient methods as discussed above.

In view of the foregoing, a system and method is needed for providing communication quickly and effectively while keeping employees on task. The system and method must be cost effective, easy to install, adaptable to changes in layout, and applicable to non-conveyor driven environments.

SUMMARY OF INVENTION

One aspect of the present invention is to provide a wireless communication system and method for using the same in an industrial setting, such as manufacturing, assembly, and processing facilities. In one embodiment, multiple transmitter stations and a receiver station communicate via a wireless signal.

Each transmitter station may comprise a stand that is used to hold and elevate an indicator light. The transmitter station plugs into a conventional power outlet for power and no additional wiring is necessary. When assistance is needed, the transmitter station is activated using a manual or automatic switch. A light on the transmitter station is activated and a transmitter transmits a signal. A receiver in the receiver station receives the signal.

Alternatively, the transmitter stations may have a plurality of sensor input ports that may be used to collect data. The sensors may or may not be connected to indicator lights or tone generators of the transmitter and receiver.

According to yet another aspect of the invention, the receiver station comprises a box containing a receiver and has lights, a tone generator and data output ports that may be mounted on or off of the box. The receiver unit plugs into a standard power outlet and no additional wiring is necessary. The receiver activates a light and turns on the tone generator when the receiver detects a signal. Upon hearing the tone generator, responsible parties may look to the receiver unit to see which light is illuminated to determine the type of assistance required and the responsible party. The responsible party then identifies and approaches the activated transmitter station to give assistance. The switch on the transmitter station is then turned off and the whole andon system returns to standby mode. Alternatively, the receiver may receive some signals from the transmitter that do not activate the receiver's lights and tone generator. These signals can be provided to a computer for record keeping and interpretation.

The system and method according to the present invention provides many advantages and improvements over the prior art. The system does not require running conduits or cables to system components, because the system can simply be plugged into an available power source that is within close proximity to the components. The installation method of the present invention consists of simply placing the transmitter stations and the receiver station where desired, placing the transmitter station switches where desired, and plugging the stations into a power source. There is no costly, time-consuming installation as with other andon systems. Employees can quickly activate the system without having to leave their workstation and can continue to work while waiting for assistance. The system can be used with or without a conveyor system. The system does not utilize expensive control devices and is more affordable than other communication systems. The system is very flexible because the transmitter stations can be moved and rearranged as easily as moving a lamp in one's home.

The foregoing and other features of the invention are more fully described in the following description that describes certain illustrative embodiments of the invention. These illustrative embodiments are merely indicative of but a few of the various ways in which the principles of the present invention may be employed. Accordingly, specific structural and functional details of the illustrative embodiments are not interpreted as limiting, but merely as representative to teach one skilled in the art how to employ the present invention.

DETAILED DESCRIPTION

Figure 1:
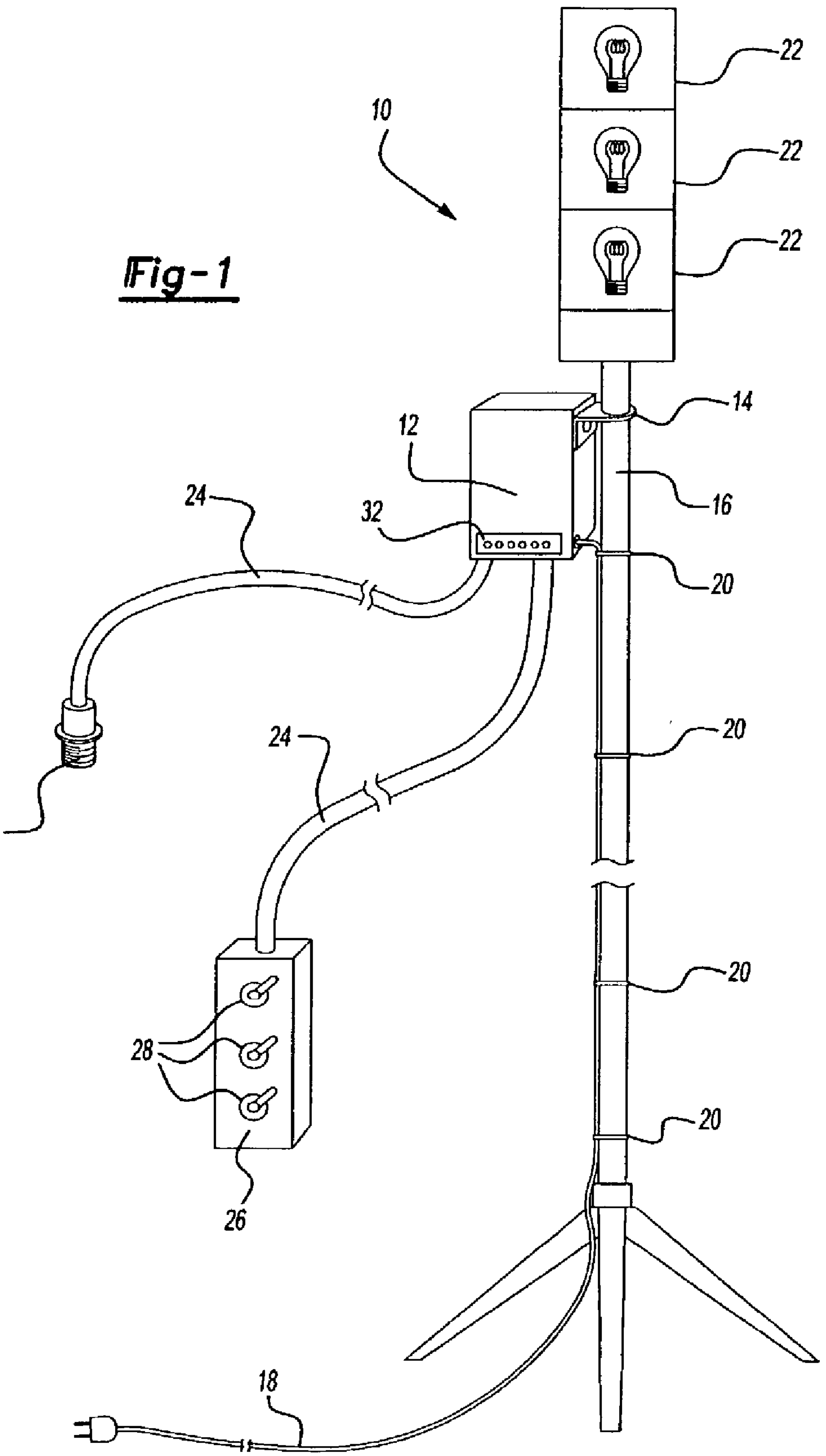
FIG. 1 is a perspective view of one embodiment of a transmitter station according to the invention.

Referring now to FIG. 1, a transmitter station is generally indicated by reference numeral 10. The transmitter station 10 has a transmitter housing 12 that is connected by a bracket 14 to a stand 16. The transmitter station 10 may be simply installed by connecting a power cord 18 to a conventional electrical outlet (not shown). The power cord 18 is secured to the stand 16 by means of plastic ties 20 to reduce the risk of snagging the power cord 18 and pulling the transmitter station 10 over.

The transmitter station 10 also includes a plurality of lights 22. The lights may be colored lights of any type including, but not limited to incandescent lights, LED lights, or the like. The lights may be flashing or rotating lights (not shown) that enhance their visibility. Flexible conduit 24, protected wire, or shielded wire, is connected between the transmitter housing 12 and a switch box 26 that includes manually operable switches 28. The manually operated switches 28 may be toggle switches or push button switches (not shown). The conduit 24 encloses wires (not shown) connecting the switches 28 to the transmitter housing 12 as will be more specifically described below. Sensors 30, such as proximity switches, limit switches, (not shown),or scale switches (not shown) can attached to the transmitter housing 12. The sensors 30 may be connected to part supply ends (not shown), hoppers (not shown), or flow racks (not shown) to indicate that a line station (not shown) requires restocking. One or more connectors 32 may be provided for connecting a sensor 30, monitor (not shown) or counter devices (not shown) to the control circuitry in the transmitter stion 10. One light 22 is provided for each switch 28 or sensor 30 so that it can be visually determined which switch 28 or sensor 30 triggered the transmitter station 10.

Figure 2:
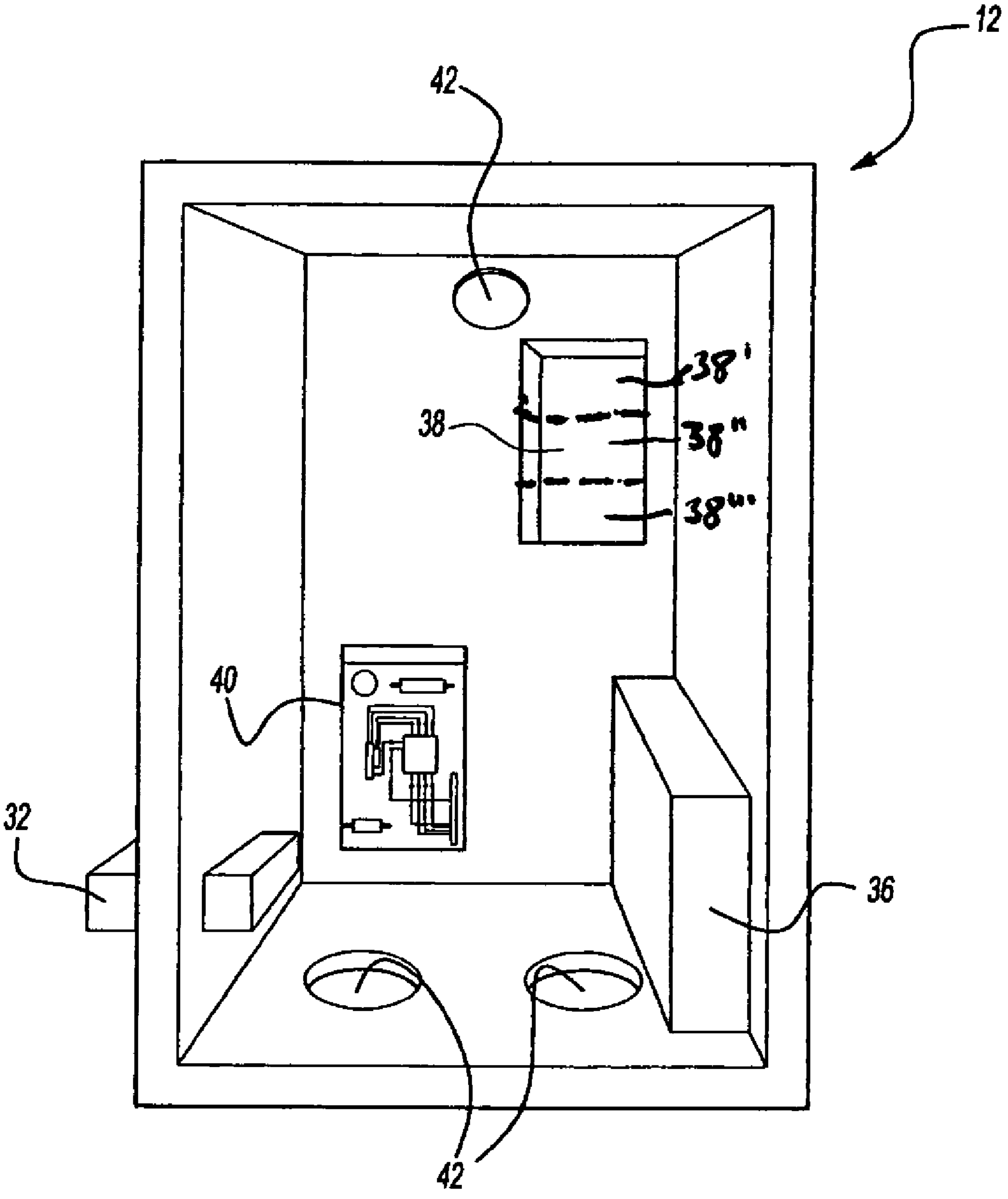
FIG. 2 is a front perspective view of one embodiment of the transmitter box according to the invention.

Referring now to FIG. 2, the contents of the transmitter housing 12 is schematically shown. The transmitter housing 12 houses a power transformer 36 that provides power to a transmitter 38. A port connector 32 may also be provided. The power transformer 36 may also provide power for the lights 22, switches 28 and sensors 30, as shown in FIG. 1, if necessary. A circuit board 40 may be provided to control inputs and outputs. Holes 42 are provided in the transmitter housing 12 for wire that extends to the lights 22, switches 28 and sensors 30 as shown in FIG. 1, through the flexible conduit 24, shielded wire, or the like, as shown in FIG. 1. A plurality of single channel transmitters 38',38",38'" may be provided or a single transmitter 38 having multiple channel capabilities may be provided. The transformer 36 may be used to convert alternating current to direct current power. Other current supplies may be used and other power outputs may be provided as is well known in the art. If alternating current is not available in a particular location, power may be obtained from a battery, solar or other source (not shown).

Figure 3:
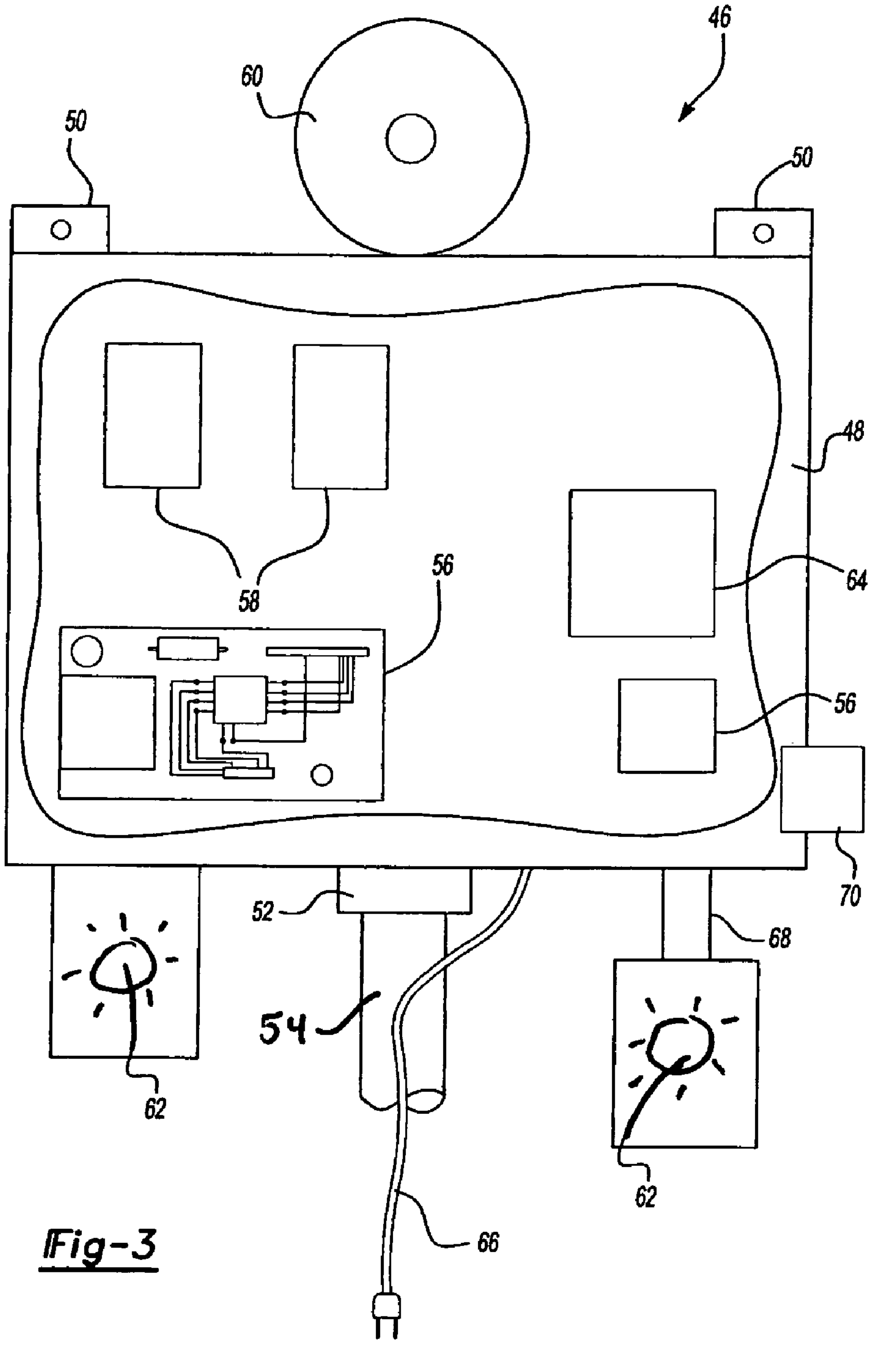
FIG. 3 is a perspective view of one embodiment of a receiver station according to the invention.

Referring now to FIG. 3, a receiver station 46 is illustrated that includes a housing 48. The housing 48 may be connected to a mounting surface by means of hanging clips 50. Alternatively, a pipe bracket 52 may be provided to connect the housing 48 to a pipe 54. A control circuit 56 is actuated by receivers 58. When the control circuit 56 is actuated, tone generator 60 or lights 62 may be switched on; and, if desired, data signals may be sent to a computer via a parallel, serial, usb port or other connector 70. The tone generator 60 may be a horn, buzzer, or audio speaker that are used to provide an audible alarm or audible voice message. The lights 62 are preferably of different colors and may be incandescent, LED or other types of light fixture. The light fixtures may include a rotating or flashing display element (not shown) if desired. The receiver station 46 includes its own power source 64 that may be connected by a power cord 66 to a source of AC current. Alternatively, power source 64 can be battery powered or solar powered (not shown), particularly if a source of AC current is not readily available. The lights 62 may be mounted at a distance from the housing 48 and, if so, may be connected by conduit 68 to the housing 48.

Figure 4:
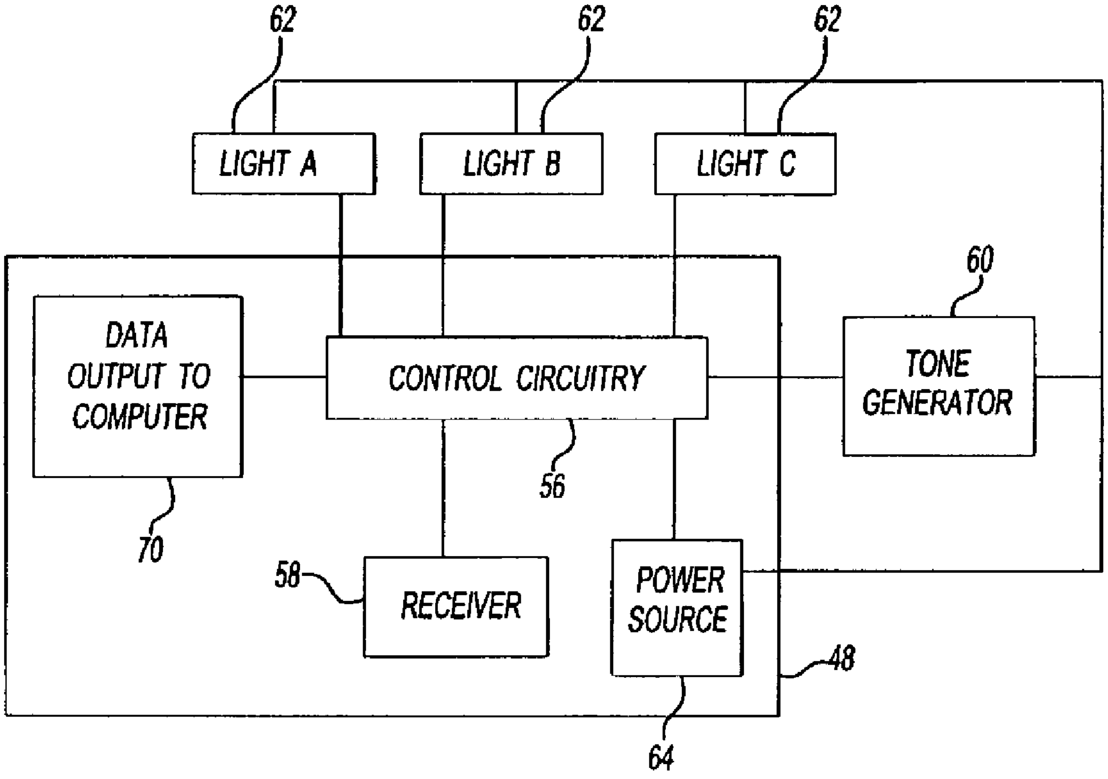
FIG. 4 is a simplified schematic of one embodiment of a receiver station according to the invention.

Referring now to FIG. 4, a simplified schematic of the receiver station 46 is shown. Receivers referred to by reference numeral 58 are housed in a receiver box 48. Receivers, upon receipt of the appropriate signal from the transmitter, actuate the control circuit 56 that operates the tone generator 60. Also, the control circuit 56 actuated by the receiver activates receiver lights A, B, and C that are referred to by reference numeral 62. The receiver 58, control circuit 56, lights 62, tone generator 60, are all powered by the power source 64 that may, if desired, be a dual AC/DC power supply. One or more port connectors 70 may be provided to permit connection of the receiver to a computer.

Figure 5:
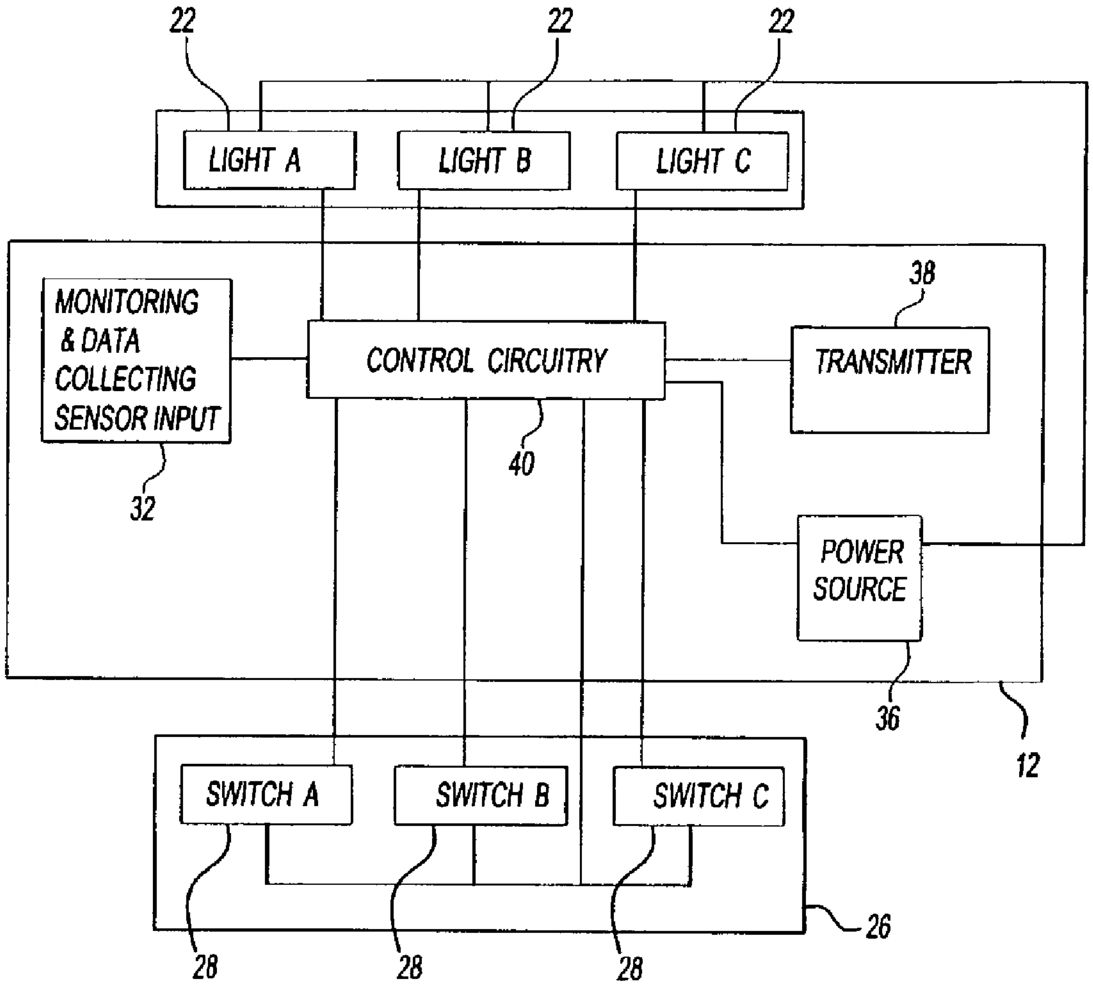
FIG. 5 is a simplified schematic of one embodiment of a transmitter station according to the invention.

Referring now to FIG. 5, a simplified schematic of a transmitter station is shown to include a transmitter housing 12. Transmitter 38 is housed within the housing 12 along with a power source or power transformer 36 that provides power to the transmitter 38. A switch box 26 houses switches A, B and C referred to by reference numeral 28 that are used to turn the transmitter on and off. When the transmitter is turned on, an analog or digital signal such as a radio frequency, Bluetooth, infrared, cellular and/or microwave signal is transmitted to the receiver as previously described with reference to FIG. 4. In addition, transmitter lights A, B and C, commonly referred to by reference numeral 22, are illuminated to provide line-of-sight communication if the service personnel or responsible party is in a location from which the transmitter lights may be observed. In this way, responsible personnel would be alerted to a problem by any transmitter lights that are associated with the transmitter station 10 or may be alerted by means of the receiver station 46. In addition, monitoring and data collection sensor input 32 allows for additional sensors, monitors or switches to be connected to the transmitter unit.

Figure 6A:
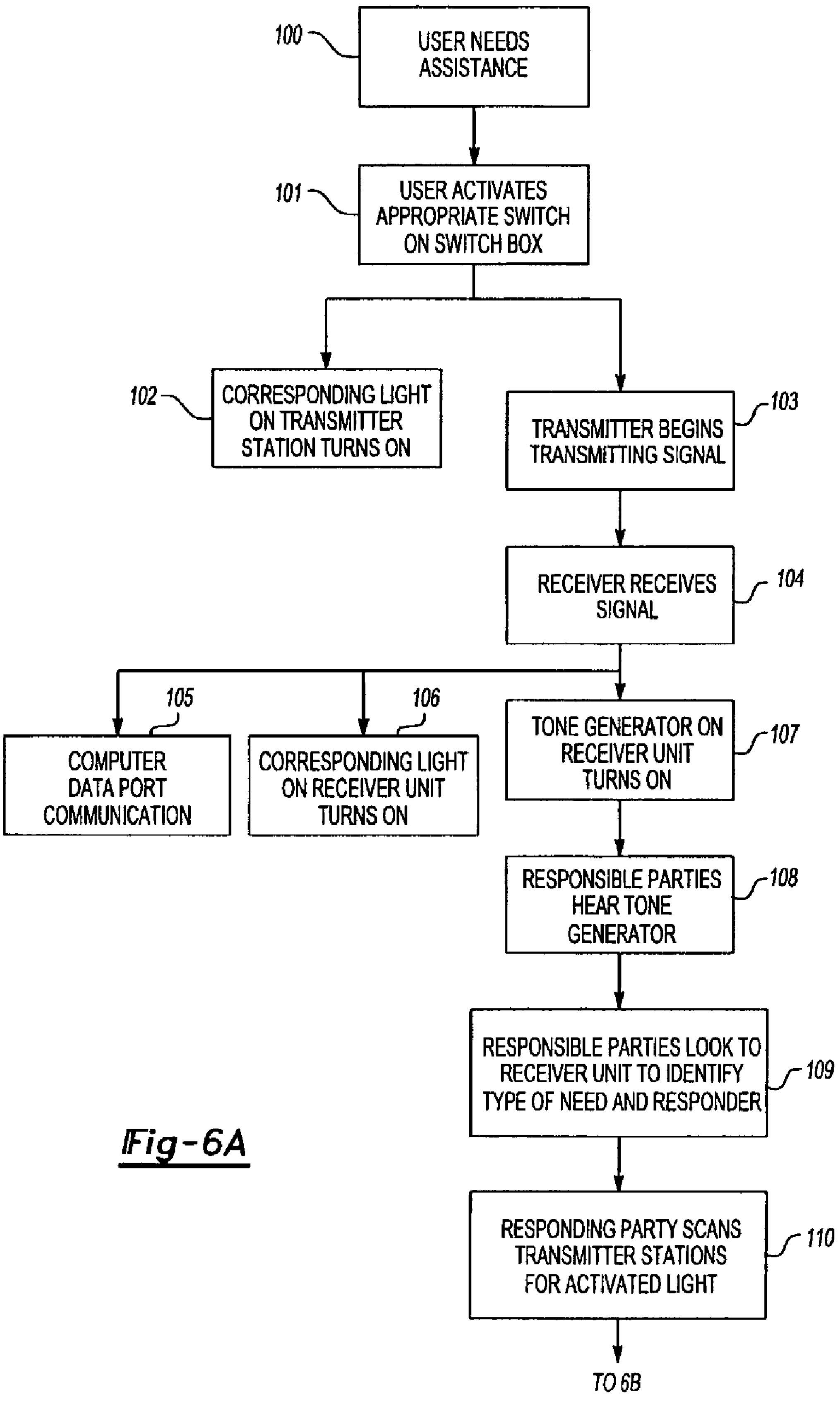
FIGS. 6A and 6B are two parts of a flowchart of one embodiment of a method according to the invention.
Figure 6B:
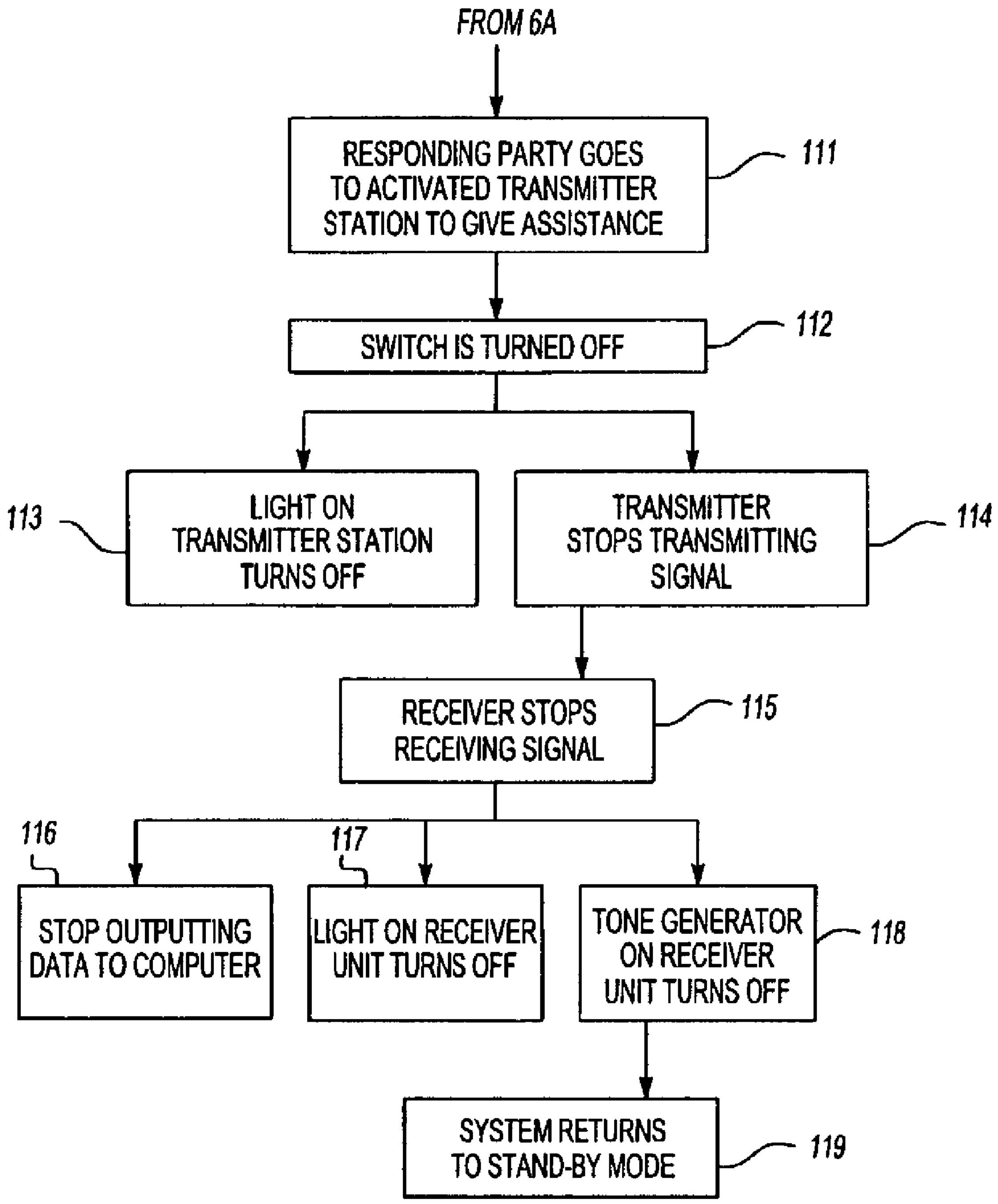

Operation of the system and method is described with reference to FIG. 6, which is a flowchart showing the logic of one embodiment of the invention. In step 100, the employee or user determines that they need assistance. For illustration purposes only, it will be demonstrated that the user needs assistance from a supervisor; and for illustration purposes only, it will be demonstrated that a yellow light corresponds to "Supervisor Assistance Needed." In step 101, the user activates the switch 28 in FIG. 1 labeled for supervisor and then returns to task. Now that the "Supervisor" switch has been activated, in step 22 the yellow light 22 in FIG. 1 on the transmitter station 10 is illuminated. Simultaneously, in step 103, one of the transmitters 38 begins transmitting a signal. In step 104, the receiver 58 in FIG. 3 receives a specific signal which the receiver recognizes as the "Supervisor Assistance Needed" signal. In step 105, communication of data to a computer may be ported through data port 70. In step 106, the receiver turns on the yellow "Supervisor Assistance Needed" light 62 in FIG. 3. Simultaneously, in step 107, the receiver 58 turns on the tone generator 60 in FIG. 3, which begins to emit an audible tone. In step 108, the supervisors hears the tone. In step 109, the supervisor looks to the receiver unit and sees that the "Supervisor Assistance Needed" light is on. In step 110, the supervisor then scans the transmitter units to identify the transmitter unit with the illuminated yellow light. In step 111, the supervisor goes to the activated transmitter station 10 to give assistance. In step 112, the switch 28 at the transmitter station 10 is turned off. Then in step 113, the light 22 on the transmitter station 10 is turned off; and at 114, the transmitter 38 stops transmitting a signal. In step 115, the receiver 58 stops receiving a signal. At 116, data port communication to the computer is terminated. In step 117, the light 62 on the receiver station 46 is turned off; and at 118, the tone generator 60 is turned off. In step 119, the wireless andon communication system returns to stand-by mode.

Figure 7A:
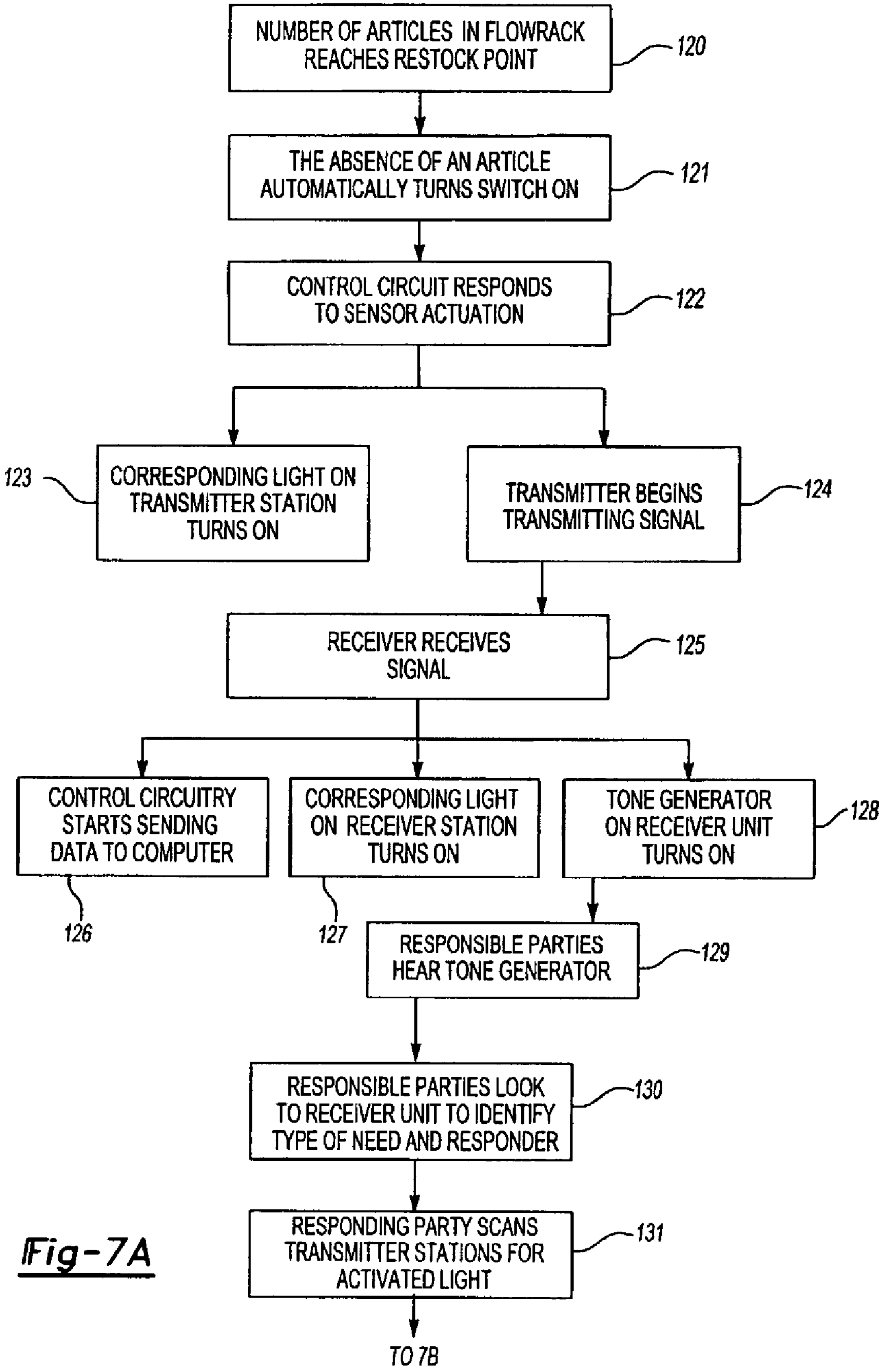
FIGS. 7A and 7B are two parts of a flowchart of another embodiment of a method according to the invention.
Figure 7B:
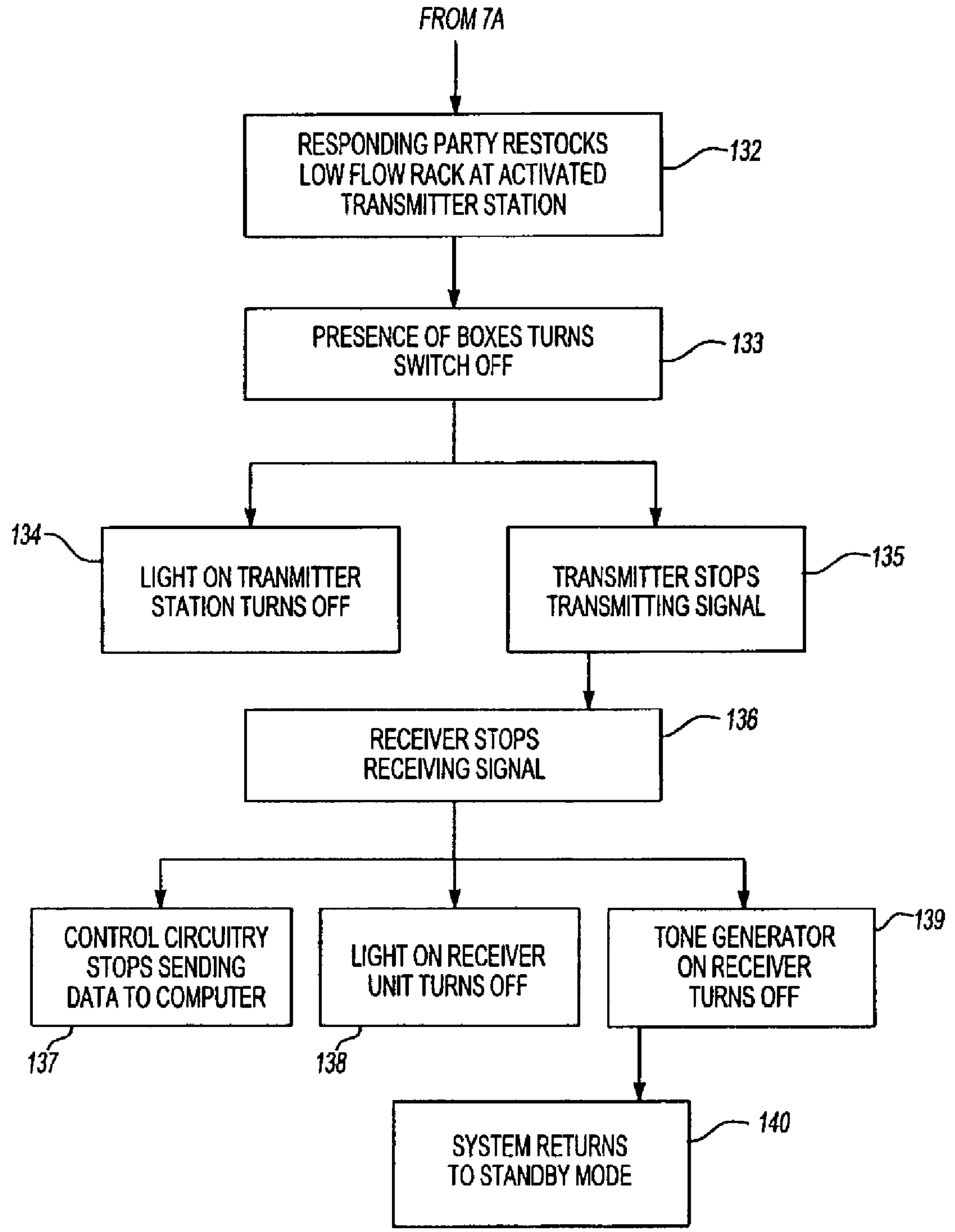

Another example illustrating operation of the system and method is described with reference to FIG. 7, which is a flowchart showing the logic of another embodiment of the invention. This flowchart is designed, not to limit, but to illustrate how the system and method can be applied to sensors 30 that are not manually actuated and may aid in summoning material handling or maintenance assistance. For this illustration, a sensor 30 in FIG. 1 has been added to detect the presence of a box at a certain position in a flow rack. The flow rack has to be restocked when the sensor 30 no longer detects a box or article. In addition, for illustration purposes only, it will be demonstrated that a green light corresponds to "Material Handler Assistance Needed." In step 120, the number of boxes or articles in the flow rack reaches a restocking point. In step 121, the sensor 30 is activated since there is no box present to turn the sensor 30 off. At 122, the control circuit responds to actuation of the sensor 30. Now that the sensor 30 has been activated, in step 123, a green light 22 in FIG. 1 on the transmitting station 10 is illuminated. In step 124, one of the transmitters 30 begins transmitting a signal. At 126, the control circuit may initiate sending data to the computer via the port 70. In step 127, the receivers 58 in FIG. 3 receives a specific signal which the receiver recognizes as the "Material Handler Assistance Needed" signal. In step 127, the receiver 58 turns on the green "Material Handler Assistance Needed" light 62 in FIG. 3. Simultaneously, in step 128, the receiver 58 turns on the tone generator 60 in FIG. 3, which begins to emit an audible tone. In step 129, the material handler hears the tone. In step 130, the material handler looks to the receiver unit 46 and sees that the "Material Handler Assistance Needed" light is on. This tells the material handler that an operator or a flow rack in their area needs attention. In step 131, the material handler then scans the transmitter units 10 to identify the transmitter unit 10 with the illuminated green light 22. In step 132, the material handler goes to the activated transmitter station 10 to restock the flow rack. In step 133, the sensor 30 at the flow rack is turned off once it detects that a box is present. Then in step 134, the light 22 on the transmitter station 10 is turned off and at 135 the transmitter 38 stops transmitting a signal. In step 136, the receiver 58 stops receiving a signal and at 137 the control circuit terminates communication to the computer. In step 138, the light 62 on the receiver station 46 is turned off; and at 139, the tone generator 60 is turned off. In step 140, the wireless andon communication system returns to standby mode.

Figure 8:
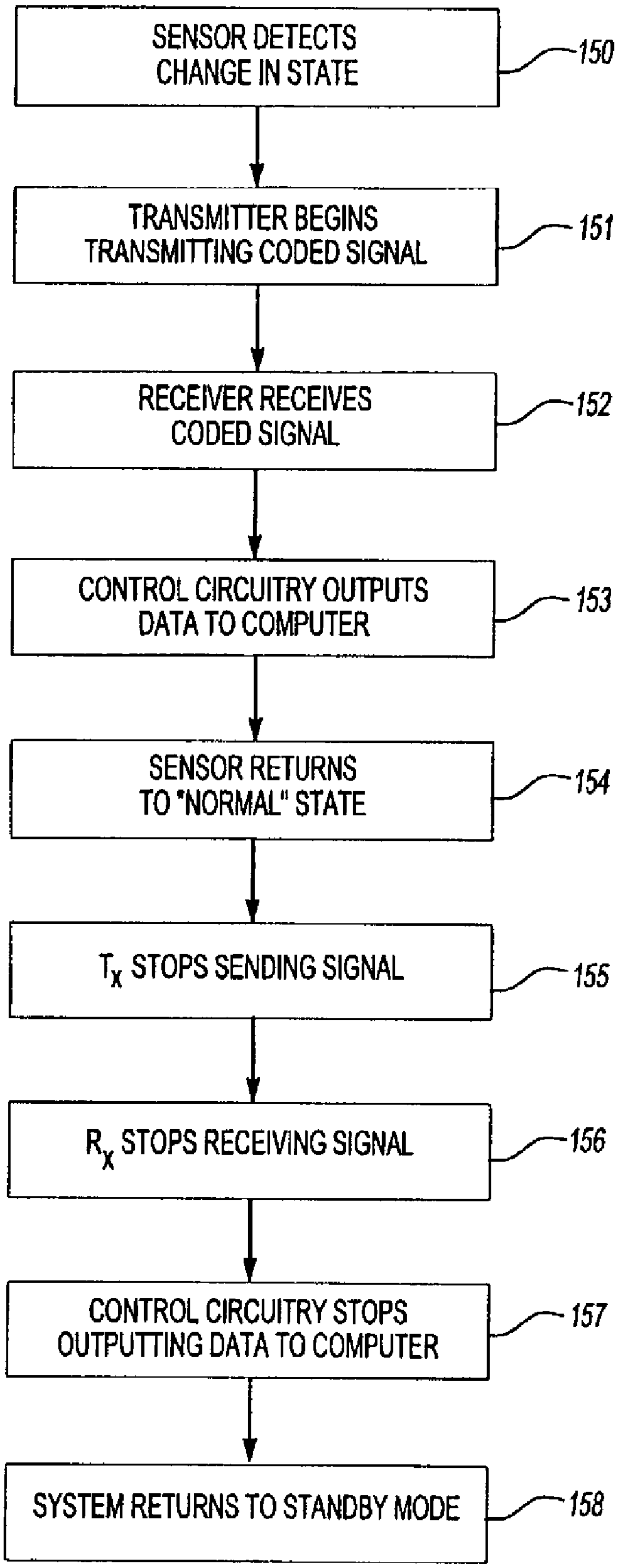
FIG. 8 is a flowchart showing an alternative embodiment of the invention.

While the above embodiment discloses the use of a tone generator, it should be understood that the system could also be developed or programmed for silent operation as illustrated in FIG. 8. At 150 sensor, such as a motion detector, proximity switch, manual switch, light switch, or the like detects a change in state. The transmitter begins at 151 to transmit a coded signal that is most likely a digitally coded signal. The receiver receives the coded signal at 152 that was sent by the transmitter at 151. The control circuit within the receiver unit outputs data to a computer that monitors an operation at 153. At 154, the sensor returns to its "normal" state. When the sensor returns to its normal state, the transmitter stops sending the digital signal at 155 and the receiver stops receiving the signal at 156. As a result, the control circuitry, at 157, stops sending data to the computer at 157. The system then returns to the standby mode at 158.

While the best mode for carrying out the invention has been described in detail, those familiar with the art to which this invention relates will recognize various alternative designs and embodiments for practicing the invention as defined by the following claims.

The invention claimed is:

1. A portable communication system for a production facility comprising:

at least one transmitter station that is adapted to be set up at a first location in a production facility, the transmitter station having at least one transmitter that is operable to transmit a wireless signal, a transmitter power supply that converts alternating current from a first power source to direct current for powering the transmitter, a transmitter light mounted proximate the transmitter station and wired to the transmitter so that it is illuminated when the transmitter transmits the wireless signal, a switch for controlling the transmitter and the light to indicate that service is required at the location;

a receiver station that is adapted to be set up at a second location in a production facility, the receiver station having at least one receiver for receiving the wireless signal from the transmitter, a receiver power supply that converts alternating current from a second power source to direct current for powering the receiver, a receiver light mounted proximate the receiver station, and a sound generator;

wherein the transmitter station and receiver station are portable in that they may be set up for immediate use by simply connecting the transmitter station to the first power source and connecting the receiver station to the second power source, and wherein actuation of the switch causes the transmitter light of the transmitter station to be illuminated and the transmitter to transmit the wireless signal to the receiver that in turn illuminates the receiver light and activates the sound generator; and wherein the transmitter station includes two or more transmitters, two or more transmitter lights, and two or more switches that are connected in two or more parallel circuits, and wherein the receiver station has two or more receivers, and two or more receiver lights that are illuminated, and wherein a tone generator is provided for sending an audible signal when the switches are actuated.

2. The portable communication system of claim 1 wherein the switch is a manually operated switch.

3. The portable communication system of claim 1 wherein the switch is a sensor that is actuated in response to a sensed condition.

4. The portable communication system of claim 1 wherein the transmitter station is mounted on a portable stand having a plurality of legs that are placed on the floor and an upright portion to which a housing enclosing the transmitters and the power supply is attached in a spaced relationship to the floor.

5. The portable communication system of claim 4 wherein the transmitter light is supported by flexible supports on the housing that permit the lights to be positioned in a range of positions to improve visibility.

6. The portable communication system of claim 1 wherein the transmitter power supply is a transformer and the first power source is a receptacle to which the transmitter power supply is connected by a plug.

7. The portable communication system of claim 1 wherein the receiver power supply is a transformer and the second power source is a receptacle to which the receiver power supply is connected by a plug.

8. A portable communication system for a production facility comprising:

at least one transmitter station that is adapted to be set up at a first location in a production facility, the transmitter station having at least one transmitter that is operable to transmit a wireless signal, a transmitter power supply that converts alternating current from a first power source to direct current for powering the transmitter, a transmitter light mounted proximate the transmitter station and wired to the transmitter so that it is illuminated when the transmitter transmits the wireless signal, a switch for controlling the transmitter and the light to indicate that service is required at the location;

a receiver station that is adapted to be set up at a second location in a production facility, the receiver station having at least one receiver for receiving the wireless signal from the transmitter, a receiver power supply that converts alternating current from a second power source to direct current for powering the receive, a receiver light mounted proximate the receiver station, and a sound generator;

wherein the transmitter station and receiver station are portable in that they may be set up for immediate use by simply connecting the transmitter station to the first power source and connecting the receiver station to the second power source, and wherein actuation of the switch causes the transmitter light of the transmitter station to be illuminated and the transmitter to transmit the wireless signal to the receiver that in turn illuminates the receiver light and activates the sound generator;

wherein the transmitter station includes two or more transmitters, two or more transmitter lights, and two or more switches that are connected in two or more parallel circuits, and wherein the receiver station has two or more receivers, and two or more receiver lights that are illuminated, and wherein a tone generator is provided for sending an audible signal when the switches are actuated; and wherein the transmitter has two or more channels, two or more transmitter lights, and two or more switches that are connected in two or more parallel circuits, and wherein the receiver is capable of receiving signals on two or more channels, and two or more receiver lights that are illuminated, and wherein a tone generator is provided for sending an audible signal when the switches are actuated.

* * * * *